(12) United States Patent
Toshniwal et al.

(10) Patent No.: US 10,873,513 B2
(45) Date of Patent: Dec. 22, 2020

(54) WORKLOAD IDENTIFICATION FOR NETWORK FLOWS IN HYBRID ENVIRONMENTS WITH NON-UNIQUE IP ADDRESSES

(71) Applicant: VMWARE, INC., Palo Alto, CA (US)

(72) Inventors: Rohit Toshniwal, Pune (IN); Abhijit Sharma, Pune (IN); Gaurav Agarwal, Bangalore (IN); Avinash Nigam, Pune (IN); Gyan Sagar Sinha, Pune (IN); Somil Bhandari, Pune (IN)

(73) Assignee: VMWare, Inc., Palo Alto, CA (US)

( * ) Notice: Subject to any disclaimer, the term of this patent is extended or adjusted under 35 U.S.C. 154(b) by 260 days.

(21) Appl. No.: 15/946,737

(22) Filed: Apr. 6, 2018

(65) Prior Publication Data

US 2019/0260654 A1    Aug. 22, 2019

(30) Foreign Application Priority Data

Feb. 20, 2018    (IN) .............................. 201841006480

(51) Int. Cl.
*H04L 12/26*    (2006.01)
*H04L 29/12*    (2006.01)
(Continued)

(52) U.S. Cl.
CPC .............. *H04L 43/08* (2013.01); *H04L 41/12* (2013.01); *H04L 43/045* (2013.01);
(Continued)

(58) Field of Classification Search
CPC ... H04L 43/08; H04L 61/2007; H04L 61/256; H04L 47/822; H04L 41/12; H04L 47/829; H04L 43/045; H04L 41/22
See application file for complete search history.

(56) References Cited

U.S. PATENT DOCUMENTS 8,184,641 B2 *  5/2012  Alt ................... H04L 29/06027
                                                  370/352
8,693,372 B2 *  4/2014  Corson .................. H04L 45/02
                                                  370/255

(Continued)

*Primary Examiner* — Mounir Moutaouakil
(74) *Attorney, Agent, or Firm* — Patterson & Sheridan, LLP

(57) ABSTRACT

Embodiments described herein generally involve identifying workloads in a networking environment based on a flow record from an observation point. In one embodiment, network data is received from one or more endpoints and used to determine a plurality of administrative domains. Each administrative domain comprises a distinct section of the networking environment within which every Internet Protocol (IP) address is unique. The network data may be used to generate observation point mapping information that maps each observation point to an administrative domain, lookup tables associated with each of the plurality of administrative domains that map IP addresses to administrative domains, and a workload identification table that maps combinations of IP addresses and administrative domains to workloads. The flow record is received from the observation point and a source and destination workload of the flow record are identified using the observation point mapping information, applicable lookup table, and workload identification table.

21 Claims, 5 Drawing Sheets

(51) Int. Cl.
*H04L 12/911* (2013.01)
*H04L 12/24* (2006.01)

(52) U.S. Cl.
CPC .......... *H04L 47/822* (2013.01); *H04L 47/829* (2013.01); *H04L 61/2007* (2013.01); *H04L 61/256* (2013.01)

(56) References Cited

U.S. PATENT DOCUMENTS

| | | | |
|---|---|---|---|
| 9,077,669 B2* | 7/2015 | Hamdi | H04L 45/7453 |
| 10,516,577 B2* | 12/2019 | Sankar | H04L 67/1031 |
| 2004/0073694 A1* | 4/2004 | Frank | H04L 47/10 |
| | | | 709/232 |
| 2006/0291446 A1* | 12/2006 | Caldwell | H04L 45/04 |
| | | | 370/351 |
| 2007/0086429 A1* | 4/2007 | Lawrence | H04L 49/1523 |
| | | | 370/351 |
| 2007/0174660 A1* | 7/2007 | Peddada | H04L 41/0663 |
| | | | 714/4.1 |
| 2008/0247392 A1* | 10/2008 | White | H04L 45/04 |
| | | | 370/392 |
| 2009/0323589 A1* | 12/2009 | Mahany | H04L 45/18 |
| | | | 370/328 |
| 2010/0014444 A1* | 1/2010 | Ghanadan | H04W 40/26 |
| | | | 370/310 |

* cited by examiner

502

| Administrative Domain 490 | |
|---|---|
| Subnet | AD |
| 451 | 490 |
| 452 | 490 |
| 453 | 490 |
| 454 | 490 |
| 455 | 492 |
| 456 | 492 |
| 457 | 492 |
| 458 | 492 |
| 459 | 494 |
| 460 | 494 |

504

| Administrative Domain 492 | |
|---|---|
| Subnet | AD |
| 455 | 492 |
| 456 | 492 |
| 457 | 492 |
| 458 | 492 |
| 459 | 494 |
| 460 | 494 |

506

| Administrative Domain 494 | |
|---|---|
| Subnet | AD |
| 459 | 494 |
| 460 | 494 |

508

| Administrative Domain 496 | |
|---|---|
| Subnet | AD |
| 464 | 496 |
| 465 | 496 |
| 466 | 496 |
| 455 | 492 |
| 456 | 492 |
| 457 | 492 |
| 458 | 492 |
| 459 | 494 |
| 460 | 494 |

510

| Administrative Domain 498 | |
|---|---|
| Subnet | AD |
| 461 | 498 |
| 462 | 498 |
| 463 | 498 |
| 455 | 492 |
| 456 | 492 |
| 457 | 492 |
| 458 | 492 |
| 459 | 494 |
| 460 | 494 |

Fig. 5

WORKLOAD IDENTIFICATION FOR NETWORK FLOWS IN HYBRID ENVIRONMENTS WITH NON-UNIQUE IP ADDRESSES

RELATED APPLICATIONS

Benefit is claimed under 35 U.S.C. 119(a)-(d) to Foreign Application Serial No. 201841006480 filed in India entitled "WORKLOAD IDENTIFICATION FOR NETWORK FLOWS IN HYBRID ENVIRONMENTS WITH NON-UNIQUE IP ADDRESSES", on Feb. 20, 2018, by VMware, Inc., which is herein incorporated in its entirety by reference for all purposes.

BACKGROUND

Records of traffic flow are often captured in networking environments and used for the purposes of troubleshooting and analysis. For example, these records may be used to determine security policies, identify dependencies, migrate workloads (e.g., computing tasks that exists with a discrete, isolated and detached set of application logic (with specific policies, rules and behavioral characteristics) that can be executed independently (and autonomously if needed) of a specific parent (or related) application), allocate resources, and the like. In some cases, flow records may include information about network traffic, such as source and destination IP addresses and ports, protocol information, and the like. Flow records may be captured at various observation points (e.g., switches, routers, firewalls, and the like) within a networking environment and aggregated by a management entity for analysis.

As networks become more complex and heterogeneous, certain difficulties may arise in the process of analyzing flow records. For example, hybrid data systems may involve a variety of different types of independent networks with different isolation, bridging, routing and network translation mechanisms being employed for any given flow. For local functions, such as routing or address translation this does not pose a problem, as these functions operate only within the context of a particular isolated network. However, global functions such as flow traffic segregation and enrichment (e.g., using data from outside sources to add more detail or context to flow records) may present complex problems in hybrid networks, as flow records may be received centrally and need to be tied back to the local contexts of flow traversal paths. As such, third-party network flow analysis systems generally restrict themselves to IP address level analytics, and optionally provide enrichment restricted to simple network topology environments. Accordingly, there is a need in the art for improved methods of network flow enrichment in hybrid data systems.

SUMMARY

Herein described are one or more embodiments of a method for identifying workloads in a networking environment based on a flow record from an observation point. The method includes: receiving network data from one or more endpoints in the networking environment, wherein the network data comprises topology data and routing data; determining, based on the network data, a plurality of administrative domains within the networking environment, wherein each of the plurality of administrative domains comprises a distinct section of the networking environment within which every Internet Protocol (IP) address is unique; generating, based on the network data, observation point mapping information that maps each observation point within the networking environment to one of the plurality of administrative domain; generating, based on the network data, a plurality of lookup tables, wherein each of the plurality of lookup tables is associated with one of the plurality of administrative domains, and wherein each of the plurality of lookup tables maps IP addresses to administrative domains; generating, based on the network data, a workload identification table that maps combinations of IP addresses and administrative domains to workloads; receiving the flow record from the observation point; and identifying a source workload and a destination workload of the flow record using the observation point mapping information, a lookup table of the plurality of lookup tables, and the workload identification table.

Also described herein are embodiments of a computer system, wherein software for the computer system is programmed to execute the method described above for identifying workloads in a networking environment based on a flow record from an observation point.

Also described herein are embodiments of a non-transitory computer readable medium comprising instructions to be executed in a computer system, wherein the instructions when executed in the computer system perform the method described above for identifying workloads in a networking environment based on a flow record from an observation point.

BRIEF DESCRIPTION OF THE DRAWINGS

FIG. 5 illustrates example lookup tables for administrative domains according to embodiments of the present disclosure.

DETAILED DESCRIPTION

Embodiments presented herein relate to systems and methods for workload identification in network flows. In this specification, the terms "logical network entity," "logical network element," and the like will refer to software defined networking (SDN) logical overlay network features. The terms, "virtual entities" and the like will refer to software-implemented networking services that reside in a distributed manner on a plurality of physical host computers and may handle logical overlay or physical underlay network traffic. In so doing, virtual entities, which include software-implemented switches, routers, tunnel endpoints, network filters/firewalls, etc., implement policies for the overlay software-defined network.

Figure 1:
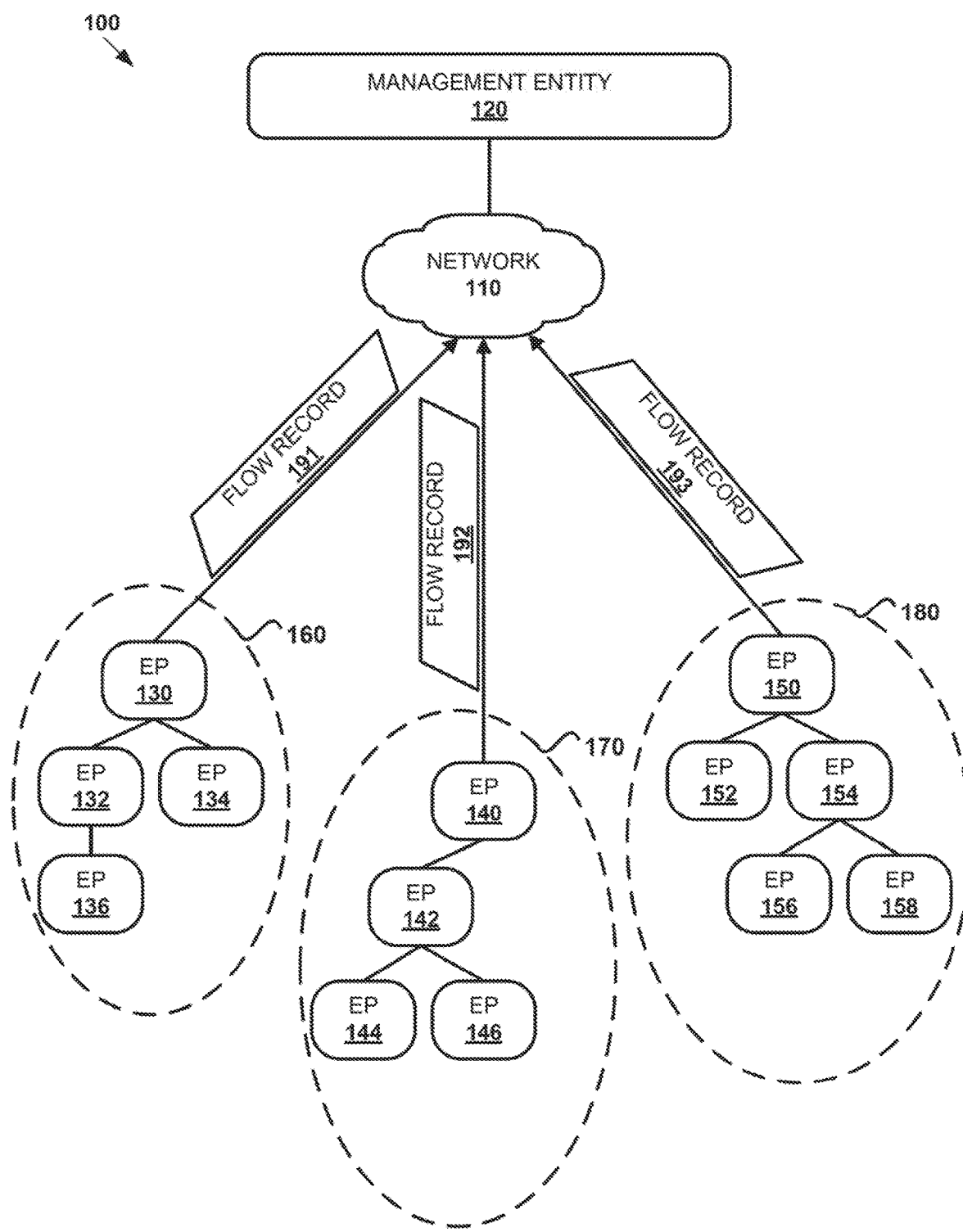
FIG. 1 is a diagram of a network environment in which embodiments of the present disclosure may be implemented.

FIG. 1 is a diagram of a network environment 100 in which embodiments of the present disclosure may be implemented. As shown, network environment 100 includes a management entity 120 and a plurality of endpoints (EPs) connected via a network 110. Management entity 120 may be a physical or virtual computing device that performs operations related to identifying workloads in network flows as described herein. Each EP (e.g., 130, 132, and the like) may comprise a physical or virtual computing device, such as a router, switch, gateway, firewall, virtual machine, desktop computer, laptop computer, mobile phone, virtual storage entity, database, server, or the like. EPs 130, 132, 134, and 136 are a part of a separate portion 160 of network environment 100, which may comprise a distinct network that employs a distinct set of isolation, bridging, routing and network translation mechanisms for any given flow than other portions (e.g., 170 and 180) of networking environment 100. Portion 170 comprises EPs 140, 142, 144, and 146, and portion 180 comprises EPs 150, 152, 154, 156, and 158. In one example, portion 160 comprises a VMware® vSphere™ Distributed Switch (VDS) network, portion 170 comprises a VMware® NSX™ network, and portion 180 comprises an Virtual Private Cloud (VPC) network. These examples are not limiting, and are included to demonstrate the different types of networks that may be included in a hybrid networking environment.

Flow records 191, 192, and 193 may comprise records of network traffic that are captured by one or more EPs (e.g., 130, 140, and 150) and sent to management entity 120. For example, flow records 191, 192, and 193 may comprise netflow records. Netflow is a set of techniques for collecting and analyzing network "flows" (or recorded network traffic) in order to analyze network status. In certain embodiments, flow records 191, 192, and 193 comprise "5-tuples" which include a source IP address, destination IP address, source port, destination port, and protocol. Flow records 191, 192, and 193 may, in some instances include flow statistics (e.g., packets dropped, timeouts, failures, and the like). Flow records 191, 192, and 193 may further comprise observation point information about the observation point (e.g., endpoint) at which the record was captured, such as an IP address or other identifier of a router, switch, gateway, firewall, or other entity that captured the flow record.

Management entity 120 may collect and analyze flow records in order to determine security policies, identify dependencies, migrate workloads, allocate resources, and the like. For example, management entity 120 may be associated with a service provider (e.g., a provider of database services, streaming services, web services, or the like) that serves a plurality of endpoints in a hybrid network environment. Key components in the process of analyzing flow records are segregation and deduplication of flow records, as well as identifying workloads associated with flow records. However, because network environment 100 is a hybrid networking environment which may include non-unique IP addresses (e.g., each portion 160, 170, and 180 may include its own set of IP addresses that may overlap with IP addresses of other portions), it may be difficult to identify a source and destination workload of a flow record based on a source and destination IP address. These obstacles to accurately determining the workload information for source and destination IP addresses constitute a significant challenge and prevent visibility into traffic patterns and application dependencies based on unsegregated flow records having overlapping IP addresses.

Note that any network flow may traverse multiple networking layers and its information may be reported by each of these layers with the same 5-tuple but different observation point information. Moreover, each layer reports any given flow by breaking up its session information into multiple flow records for both directions of traffic. These records need to be stitched together and the statistics from different layers need to be de-duplicated. Keying the received records on 5-Tuples addresses this issue in some cases. However, in networking topologies where the IP addresses are not unique (e.g., NSX, VPC, etc.), one may expect to receive records for two or more distinct concurrent network flows each having the same 5-Tuple. One needs to segregate the records corresponding to participating workloads for keeping the analysis correct. Additionally, this needs to be done at a very high rate with which the flow records are being received, which may sometimes be more than a million records per second in reasonably large network environments. Furthermore, once the flow records are segregated and de-duplicated, one needs to identify the actual workload information for the received flows for making them useful in planning and analytic exercises.

Every flow record contains observation point information that specifies or describes the precise point in the networking topology where the flow was observed. If there was a network view of the entire networking topology from this vantage point, then flow endpoint IP addresses could be uniquely identified. Enriching every flow record based on the network view from which the flow was observed will result in disambiguated records that can be uniformly segregated, and redundant information reported from different observers can be de-duplicated. Accordingly, embodiments of the present disclosure involve aggregating (e.g., by management entity 120) network data such as topology and routing data from a plurality of endpoints (e.g., routers, switches, gateways, firewalls, and the like) throughout the network environment, and using this network data to create a detailed network topology. Management entity 120 may then utilize the network topology for determination of administrative domains (e.g., network views) within which every IP address is unique.

After determining a plurality of administrative domains, management entity 120 may generate, based on the network topology, observation point mapping information that maps observation points to administrative domains. For example, within each administrative domain, management entity 120 may identify each workload within the administrative domain and add an entry to the observation point mapping information that maps the administrative domain to each observation point that observes the workload. Management entity 120 may then generate a plurality of lookup tables based on the network topology, each lookup table being associated with a particular administrative domain, and each lookup table mapping IP subnets (e.g., groups of IP addresses) to administrative domains. For example if IP addresses within a first administrative domain can communicate with particular IP subnets within a second administrative domain, the lookup table for the first administrative domain will map the particular IP subnets to the second administrative domain (e.g., if these IP subnets are encountered within a flow record observed within the first administrative domain, then the table will indicate that they belong to workloads within the second administrative domain). Management entity 120 may also generate a workload identification table that maps workloads to combinations of IP addresses and administrative domains. For example, each <IP address, administrative domain> pair may be mapped to a workload.

In a runtime process, management entity 120 may receive flow records (e.g., flow records 191, 192, and 193) and use techniques described herein to identify a source and destination workload of each flow record. For example, management entity 120 may use the observation point mapping information to determine the administrative domain of the observation point of a flow record (e.g., based on observation point information in the flow record). Management entity 120 may then select a lookup table based on the administrative domain of the observation point (e.g., the lookup table that is associated with the administrative domain), and use the lookup table to determine source and destination administrative domains (e.g., based on source and destination IP addresses included in the flow record). In some embodiments, management entity 120 may generate a 7-tuple that includes the information from the 5-tuple included in the flow record (e.g., source IP address, destination IP address, source port, destination port, and protocol) as well as the source and destination administrative domains. This 7-tuple fully disambiguates the flow record within the network environment, as it allows workloads to be uniquely identified regardless of which portion 160, 170, or 180 the flow record was received from.

Management entity 120 may use the workload identification table to identify a source workload and a destination workload of the flow record. For example, management entity 120 may use a combination of the source IP address and the source administrative domain to identify the source workload in the workload identification table. Similarly, management entity 120 may use a combination of the destination IP address and the destination administrative domain to identify the destination workload in the workload identification table. Having uniquely identified the source and destination workloads associated with each flow record, management entity 120 may proceed with analysis operation based on the flow records. For example, management entity 120 may use the flow records to determine security policies, identify dependencies, migrate workloads, allocate resources, and the like.

Techniques described herein constitute an improvement in networking technology, as they allow for flow records to be fully disambiguated in hybrid network environments that may comprise non-unique IP addresses. Using network routing and topology information to determine administrative domains, observation point mapping information, lookup tables for administrative domains, and workload identification tables allows for flow records to be enriched with disambiguating information, and thereby improves conventional industry practice. Advantageously, the ability to uniquely identify source and destination workloads of flow records in hybrid network environments significantly enhances the analysis of such flow records, and improves the utility of decisions made based on such analysis.

It is understood that techniques described herein, such as identification of administrative domains and their relationships, can also be applied to other networking related problems like routing, reachability, and various types of analytics. While embodiments are described herein with respect to particular networking problems such as flow data desegregation and de-duplication, other embodiments may be employed without departing from the scope of the present disclosure.

Furthermore, while certain techniques are described herein (e.g., with respect to FIGS. 1-5) as involving the use of tables, it is understood that other types of data structures may be employed. Tables are merely included in this disclosure as one example, and any manner of storing associations among data may be used. For example, the observation point mapping information, the lookup tables, and the workload identification table may be implemented using a variety of types of data structures other than tables without departing from the scope of the present disclosure, such as hashes, vectors, stateless databases, databases, tree structures, etc.

Figure 2:
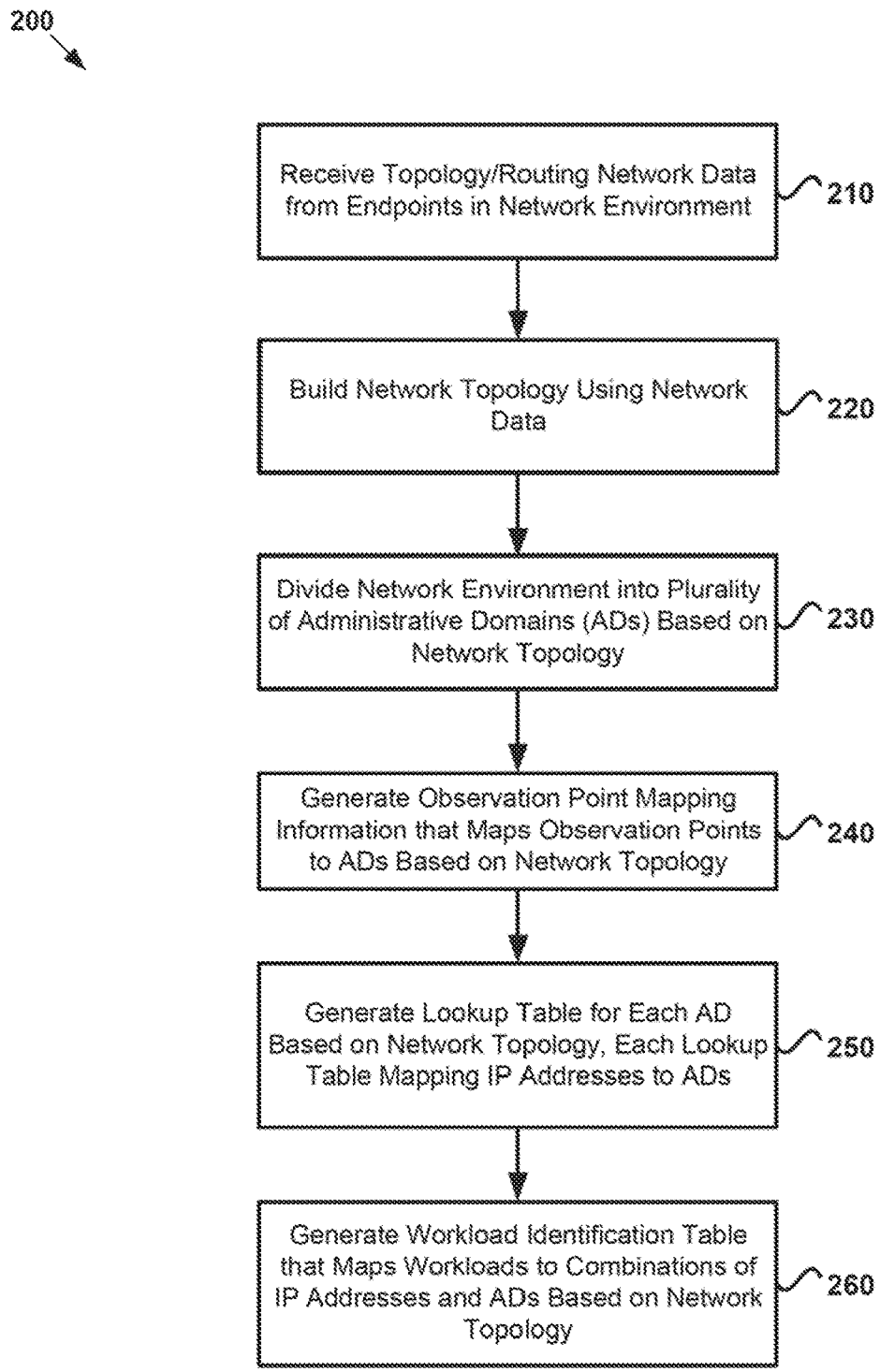
FIG. 2 illustrates example operations related to workload identification in flow records according to embodiments of the present disclosure.

FIG. 2 illustrates example operations 200 related to workload identification in flow records according to embodiments of the present disclosure. Operations 200 may, for example, be implemented by management entity 120 of FIG. 1. In some embodiments, operations 200 are performed in advance of a runtime process described with respect to FIG. 3.

At step 210, topology and routing network data is received from endpoints in the network environment. For example, network data (e.g., inventory data) may be retrieved from routers, switches, gateways, firewalls, network address translation (NAT) entities, virtual private network (VPN) entities, Amazon® web services (AWS) entities, and the like. The network data may comprise topology data, routing information, and the like.

At step 220, a detailed network topology is generated based on the network data. For example, the network topology may include a topology of all entities in the network and routing information related to the entities. For example, the network topology may be modeled as a graph where each node corresponds to an endpoint and each edge corresponds to a network link between endpoints. In some embodiments, the network topology may include observation points as well as subnets (e.g., IP addresses that correspond to workloads).

At step 230, the network environment is divided into a plurality of administrative domains based on the network topology. An administrative domain (referred to AD henceforth) is a logical segment in the network topology such that all observation points within it have the same network view. A network view can include all potentially reachable IP addresses from an observation point. For example, the network topology may be used to identify isolated sections (e.g., "islands") in the network environment.

In some embodiments, all workloads in the network environment are initially assigned to a global administrative domain. As operations continue, workloads are then moved from the global administrative domain to more specific administrative domains. Determining administrative domains may involve different steps for different types of networks. For example, in an environment involving NAT (e.g., NSX or the like), NAT information may be included in the network data, and may be used in determining administrative domains. In an AWS environment, VPCs are created that include subnets. Each subnet with a VPC is unique, and any two VPCs can be peered if they do not include any overlapping subnets. As such, in AWS environment, VPC and peer information may be used in determining administrative domains. For example, all subnets within a VPC may be assigned to the same administrative domain. Even though each subnet within a VPC may have a different network view (e.g., it may be peered with subnets of other VPCs), all subnets within a VPC may be included in the same administrative domain because peering rules guarantee that all subnets reachable from within the VPC will be non-overlapping (e.g., unique). In hybrid environments, VPN connection information (e.g., between VPCs and NSX Edges) may also be used in determining administrative domains and populating lookup tables for administrative domains. Other examples of determining administrative domains may include breaking a network environment into administrative domains such that each virtual network interface controller (VNIC) is in a separate administrative domain, choosing administrative domains such that all interfaces in a given L3 subnet are included in an administrative domain, and choosing administrative domains such that all subnets in a particular AWS VPC are included in a single administrative domain.

At step 240, observation point mapping information is generated by mapping observation points to administrative domains (ADs) based on the network topology. For example, observation point mapping information may comprise a table that maps each observation point in the network environment to an administrative domain (e.g., based on determinations made at step 230).

At step 250, a lookup table is generated for each administrative domain that maps IP subnets (or IP addresses) to administrative domains. For example, the lookup table for a given administrative domain may include each IP subnet that is potentially reachable from the given administrative domain, mapping each of these IP subnets to an administrative domain in which the IP subnet is located. For example, the network topology may be used to generate the lookup tables. This process is described in more detail with respect to FIG. 5.

At step 260, a workload identification table is generated that maps workloads to combinations of IP subnets (or IP addresses) and administrative domains. For example, the workload identification table may be generated based on the network topology and the administrative domain determinations at step 230, and may include mappings of <IP address, administrative domain> pairs to workloads. The workload identification table may be used to uniquely identify a workload once the IP address and the administrative domain of the workload have been determined (e.g., based on a flow record, observation point mapping information, and at least one lookup table).

Figure 3:
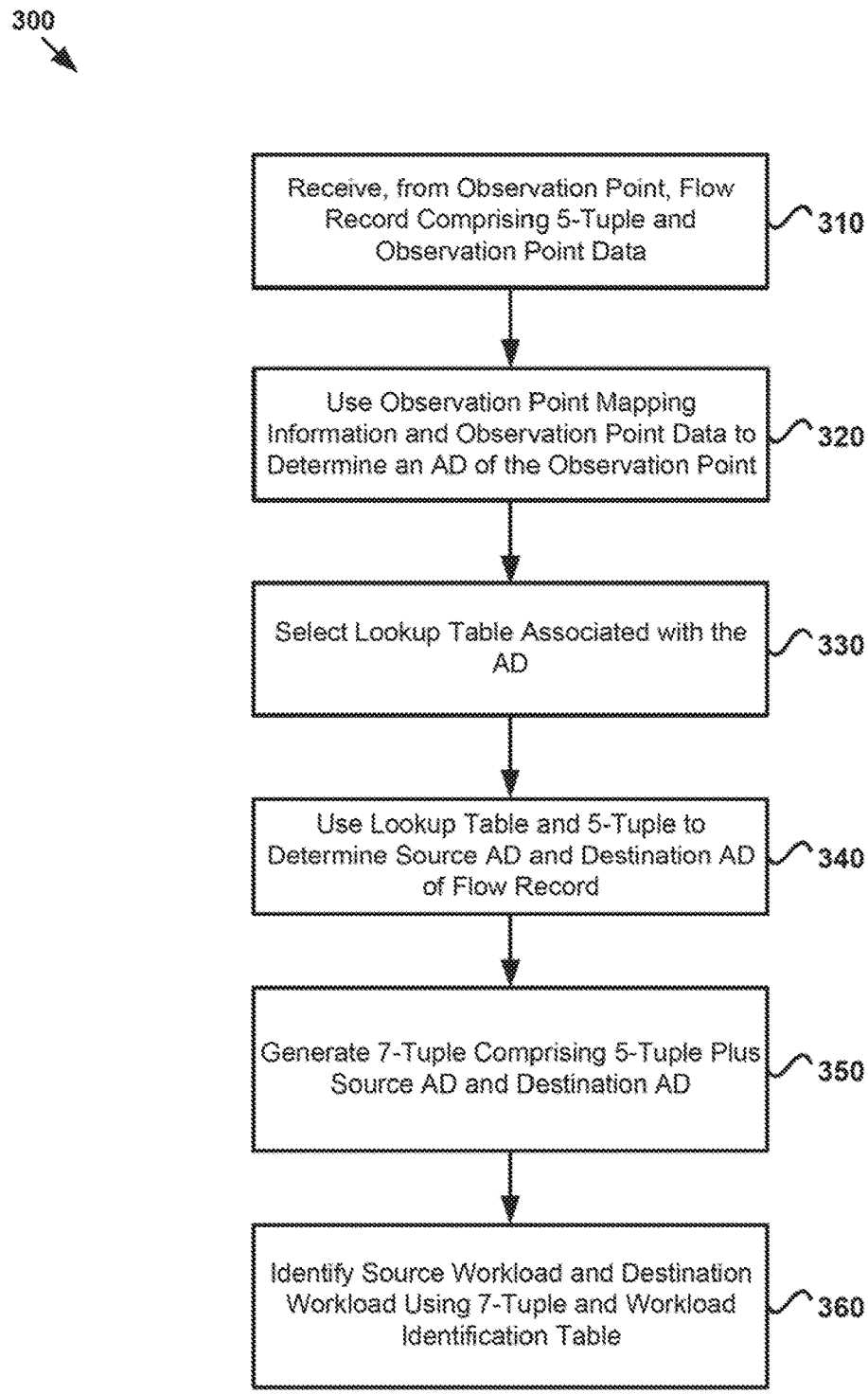
FIG. 3 illustrates additional example operations related to workload identification in flow records according to embodiments of the present disclosure.

FIG. 3 illustrates additional example operations 300 related to workload identification in flow records according to embodiments of the present disclosure. Operations 300 may, for example, be implemented by management entity 120 of FIG. 1. In some embodiments, operations 300 are performed as part of a runtime process that takes place after operations 200, which were described with respect to FIG. 2.

At step 310, a flow record is received from an observation point, the flow record comprising a 5-tuple (e.g., source and destination IP address, source and destination port, and protocol) and observation point data (e.g., IP address, host name, port, virtual machine identifier, interface identifier, network interface controller information, and/or the like). In some embodiments, the flow record may also include additional information (e.g., flow statistics).

At step 320, the observation point mapping information (e.g., generated at step 240 in FIG. 2) is used to determine an administrative domain of the observation point from which the flow record was received. For example, the observation point data of the flow record may be used to find the relevant administrative domain in the observation point mapping information.

At step 330, a lookup table (e.g., generated at step 250 in FIG. 2) is selected that is associated with the administrative domain of the observation point (e.g., determined at step 320). At step 340, the lookup table is used to determine a source administrative domain and a destination administrative domain of the flow record. For example, the source IP address and destination IP address of the flow record may be used to determine the administrative domain that is associated with each in the table (e.g., based on the IP subnets of the source and destination IP addresses).

At step 350, a 7-tuple is generated comprising the 5-tuple (included in the flow record) as well as the source and destination administrative domains (e.g., determined at step 340). The 7-tuple may therefore comprise the source IP address, destination IP address, source port, destination port, protocol, source administrative domain, and destination administrative domain.

At step 360, a source workload and destination workload are determined using the 7-tuple and the workload identification table (e.g., generated at step 260 in FIG. 2). For example, the source IP address and source administrative domain in the 7-tuple may be used to identify the source workload in the workload identification table. Likewise, the destination IP address and destination administrative domain in the 7-tuple may be used to identify the destination workload in the workload identification table.

Figure 4:
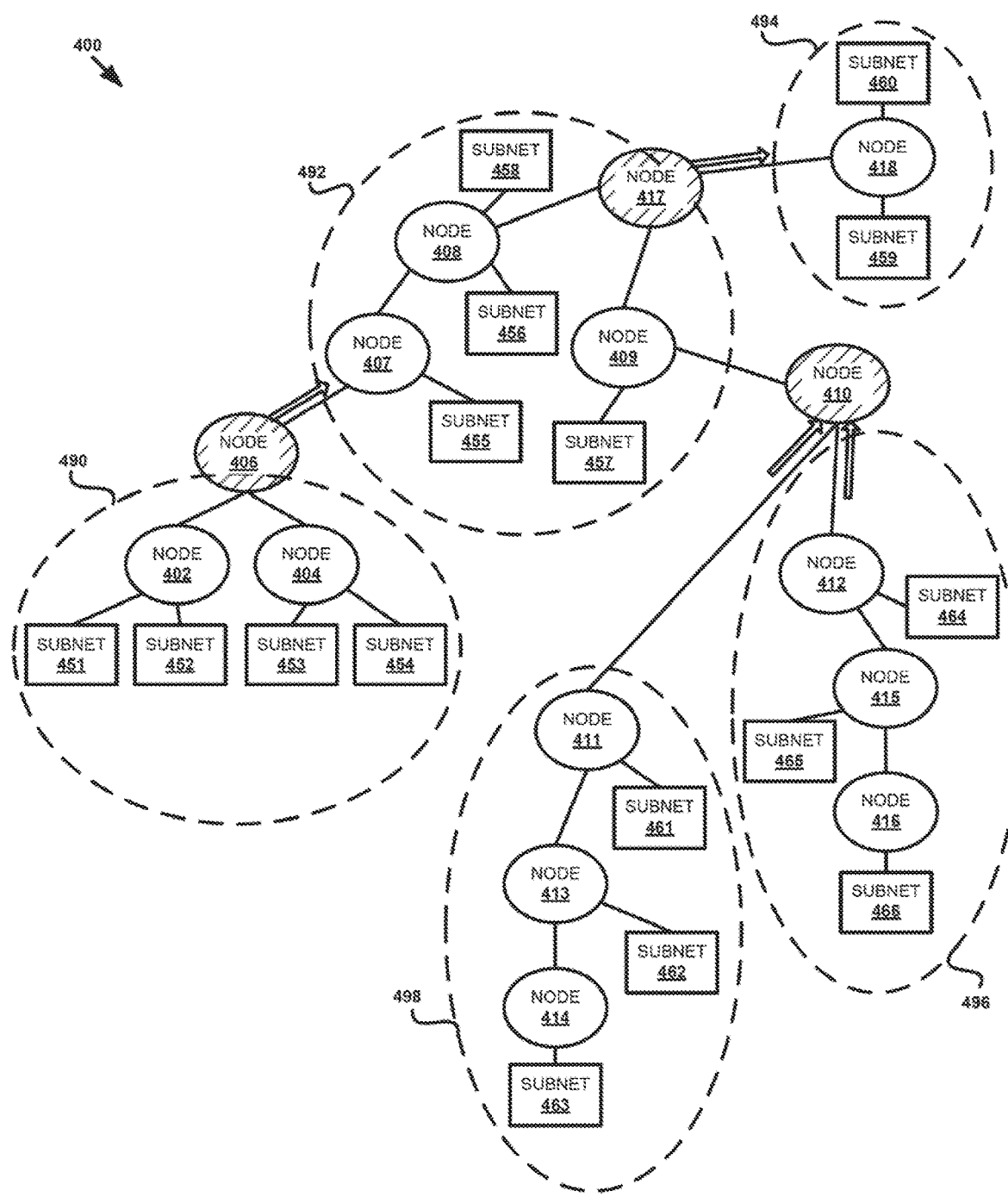
FIG. 4 illustrates an example of determining administrative domains based on network data.

FIG. 4 illustrates an example 400 of determining administrative domains based on network data.

Example 400 includes a plurality of nodes (402, 404, 406, 407, 408, 409, 410, 411, 412, 413, 414, 415, 416, and 417) and a plurality of subnets (451-466) connected by edges. For example, each node may represent an observation point and each subnet may represent a group of IP addresses that are potentially reachable from an observation point. Edges may represent network connections. In some embodiments, example 400 represents a network topology that is generated based on network data (e.g., topology and routing data) received from endpoints. The network data may comprise NAT rules, which may be used to determine direction of isolation information for a plurality of interfaces within the networking environment. A direction of isolation may indicate that any subnet behind a particular interface (e.g., associated with an observation point) is not visible from the rest of the network (e.g., subnets behind the tail of an arrow representing a direction of isolation are hidden from endpoints in front of the head of the arrow). For example, as shown, an interface associated with node 406 may be associated with a rule such that its direction of isolation (illustrated by an arrow) points only towards node 407, and not towards either node 402 or node 404. Similarly, an interface associated with node 417 may be associated with a rule such that its direction of isolation points only towards node 418, and interfaces associated with node 410 may be associated with rules such that their direction of isolation points only towards node 410 from node 411 and node 412. Nodes associated with interfaces that have direction of isolation rules (e.g., nodes 406, 410, and 417) may be removed from the network topology graph.

Administrative domains 490, 492, 494, 496, and 498 may be determined based on the topology and routing information. For example, each administrative domain may represent an isolated section of the network environment that is hidden behind a direction of isolation rule. Each subnet within an administrative domain may be unique. Furthermore, each subnet reachable from an administrative domain may also be unique. For example, the subnets in administrative domains 492 and 494 are potentially reachable from administrative domain 490 since they are in front of its direction of isolation, and they are not hidden by any direction of isolation rules that go in the opposite direction. On the contrary, no subnets outside administrative domain 494 are reachable from within administrative domain 494, as the rest of the network is hidden behind a direction of isolation leading into administrative domain 494.

In one embodiment, example 400 represents a network topology modeled as a graph in which each node corresponds to an NSX Edge and each edge corresponds to a network link between corresponding NSX Edges. Where NAT rules apply, NAT direction properties are set for each applicable edge, and nodes subject to NAT rules may be removed from the graph. A breadth first search (BFS) may then be performed in order to identify isolated sections (or "islands") in the graph. All of the nodes within an isolated section may then be grouped in an administrative domain (e.g., 490, 492, 494, 496, and 498).

FIG. 5 illustrates example lookup tables for administrative domains according to embodiments of the present disclosure. For example, lookup tables 502, 504, 506, and 508 may be generated based on example 400 described with respect to FIG. 4.

By the virtue of direction of isolation information, the lookup tables for each administrative domain may be populated based on visibility of subnets. In this example, with respect to FIG. 4, workloads present in administrative domain 490 can view the subnets of administrative domains 492 and 494, workloads present in administrative domain 492 can view the subnets of administrative domain 494, workloads present in administrative domain 494 cannot view any outside subnets, workloads present in administrative domain 496 can view the subnets of administrative domains 492 and 494, and workloads present in administrative domain 498 can view the subnets of administrative domains 492 and 494.

Lookup table 502 comprises the lookup table for administrative domain 490 of FIG. 4. As depicted, each subnet that is potentially reachable from within administrative domain 490 is mapped to the administrative domain in which it is located. Lookup table 504 comprises the lookup table for administrative domain 492 of FIG. 4, and each subnet that is potentially reachable from within administrative domain 492 is mapped to the administrative domain in which it is located. Lookup table 506 comprises the lookup table for administrative domain 494 of FIG. 4, and each subnet that is potentially reachable from within administrative domain 494 is mapped to the administrative domain in which it is located. Lookup table 508 comprises the lookup table for administrative domain 496 of FIG. 4, and each subnet that is potentially reachable from within administrative domain 496 is mapped to the administrative domain in which it is located. Lookup table 510 comprises the lookup table for administrative domain 498 of FIG. 4, and each subnet that is potentially reachable from within administrative domain 498 is mapped to the administrative domain in which it is located.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for identifying workloads in a networking environment based on a flow record from an observation point, the method comprising:
   receiving network data from one or more endpoints in the networking environment, wherein the network data comprises topology data and routing data;
   determining, based on the network data, a plurality of administrative domains within the networking environment, wherein each of the plurality of administrative domains comprises a distinct section of the networking environment within which every Internet Protocol (IP) address is unique;
   generating, based on the network data, observation point mapping information that maps each observation point within the networking environment to one of the plurality of administrative domains, wherein each observation point within the networking environment comprises an endpoint capable of observing a flow record;
   generating, based on the network data, a plurality of lookup tables, wherein each of the plurality of lookup tables is associated with one of the plurality of administrative domains, and wherein each of the plurality of lookup tables maps IP addresses to administrative domains;
   generating, based on the network data, a workload identification table that maps combinations of IP addresses and administrative domains to workloads;
   receiving the flow record from the observation point, wherein the observation point comprises an endpoint at which the flow record was observed, and wherein the flow record comprises a source IP address, a destination IP address, and an observation point; and
   identifying a source workload and a destination workload of the flow record using the observation point mapping information, a lookup table of the plurality of lookup tables, and the workload identification table by:
      using the observation point mapping information to determine an administrative domain that is mapped to the observation point;
      selecting, using the administrative domain, the lookup table of the plurality of lookup tables, wherein the lookup table is associated with the administrative domain;
      using the lookup table to determine a source administrative domain that is mapped to the source IP address and a destination administrative domain that is mapped to the destination IP address;
      using the workload identification table to identify a source workload that is mapped to a combination of the source IP address and the source administrative domain; and
      using the workload identification table to identify a destination workload that is mapped to a combination of the destination IP address and the destination administrative domain.

2. The method of claim 1, wherein the flow record comprises a tuple including the source IP address, the destination IP address, a source port, a destination port, and a protocol, and wherein the method further comprises:
   generating a second tuple comprising the source IP address, the destination IP address, the source port, the destination port, the protocol, the source administrative domain, and the destination administrative domain.

3. The method of claim 1, wherein determining, based on the network data, the plurality of administrative domains within the networking environment comprises:
   using the network data to divide the networking environment into the plurality of administrative domains such that at least one of the following is achieved:
      each given virtual network interface controller (VNIC) within the networking environment is included within an administrative domain that is specific to the given VNIC;
      all interfaces of a given layer 3 (L3) subnet within the networking environment are included within an administrative domain specific to the given L3 subnet; or
      all subnets within a given virtual private cloud (VPC) within the networking environment are included within an administrative domain specific to the given VPC.

4. The method of claim 1, wherein the network data further comprises network address translation (NAT) rules, and wherein determining, based on the network data, the plurality of administrative domains within the networking environment comprises:
   using the NAT rules to determine direction of isolation information for a plurality of interfaces within the networking environment; and
   determining administrative domain boundaries based on the direction of isolation information.

5. The method of claim 4, wherein determining the administrative domain boundaries based on the direction of isolation information comprises:
   using the network data to model a topology of the network as a graph such that each node of the graph corresponds to an interface of the plurality of interfaces and each edge of the graph corresponds to a network link between interfaces of the plurality of interfaces;
   setting a direction property for each of a plurality of edges of the graph based on the direction of isolation information;

excluding edges from the graph that have a direction property set;
running a breadth first search (BFS) of the graph to identify isolated sections of the graph; and
for each isolated section of the graph, including each node of the isolated section in an administrative domain specific to the isolated section.

6. The method of claim 1, wherein generating, based on the network data, the observation point mapping information comprises:
for each administrative domain of the plurality of administrative domains:
for each workload within the administrative domain, creating an entry in the observation point mapping information that maps the administrative domain to each observation point that captures flow records of the workload.

7. The method of claim 1, further comprising:
using the source workload and the destination workload to perform at least one of the following:
segregate the flow record with respect to a plurality of flow records; or
de-duplicate the flow record with respect to the plurality of flow records.

8. A system comprising: one or more processors; and a non-transitory computer-readable medium storing instructions that, when executed, cause the one or more processors to perform a method for identifying workloads in a networking environment based on a flow record from an observation point, the method comprising:
receiving network data from one or more endpoints in the networking environment, wherein the network data comprises topology data and routing data;
determining, based on the network data, a plurality of administrative domains within the networking environment, wherein each of the plurality of administrative domains comprises a distinct section of the networking environment within which every Internet Protocol (IP) address is unique;
generating, based on the network data, observation point mapping information that maps each observation point within the networking environment to one of the plurality of administrative domains, wherein each observation point within the networking environment comprises an endpoint capable of observing a flow record;
generating, based on the network data, a plurality of lookup tables, wherein each of the plurality of lookup tables is associated with one of the plurality of administrative domains, and wherein each of the plurality of lookup tables maps IP addresses to administrative domains;
generating, based on the network data, a workload identification table that maps combinations of IP addresses and administrative domains to workloads;
receiving the flow record from the observation point, wherein the observation point comprises an endpoint at which the flow record was observed, and wherein the flow record comprises a source IP address, a destination IP address, and an observation point; and
identifying a source workload and a destination workload of the flow record using the observation point mapping information, a lookup table of the plurality of lookup tables, and the workload identification table by:
using the observation point mapping information to determine an administrative domain that is mapped to the observation point;
selecting, using the administrative domain, the lookup table of the plurality of lookup tables, wherein the lookup table is associated with the administrative domain;
using the lookup table to determine a source administrative domain that is mapped to the source IP address and a destination administrative domain that is mapped to the destination IP address;
using the workload identification table to identify a source workload that is mapped to a combination of the source IP address and the source administrative domain; and
using the workload identification table to identify a destination workload that is mapped to a combination of the destination IP address and the destination administrative domain.

9. The system of claim 8, wherein the flow record comprises a tuple including the source IP address, the destination IP address, a source port, a destination port, and a protocol, and wherein the method further comprises:
generating a second tuple comprising the source IP address, the destination IP address, the source port, the destination port, the protocol, the source administrative domain, and the destination administrative domain.

10. The system of claim 8, wherein determining, based on the network data, the plurality of administrative domains within the networking environment comprises:
using the network data to divide the networking environment into the plurality of administrative domains such that at least one of the following is achieved:
each given virtual network interface controller (VNIC) within the networking environment is included within an administrative domain that is specific to the given VNIC;
all interfaces of a given layer 3 (L3) subnet within the networking environment are included within an administrative domain specific to the given L3 subnet; and/or
all subnets within a given virtual private cloud (VPC) within the networking environment are included within an administrative domain specific to the given VPC.

11. The system of claim 8, wherein the network data further comprises network address translation (NAT) rules, and wherein determining, based on the network data, the plurality of administrative domains within the networking environment comprises:
using the NAT rules to determine direction of isolation information for a plurality of interfaces within the networking environment; and
determining administrative domain boundaries based on the direction of isolation information.

12. The system of claim 11, wherein determining the administrative domain boundaries based on the direction of isolation information comprises:
using the network data to model a topology of the network as a graph such that each node of the graph corresponds to an interface of the plurality of interfaces and each edge of the graph corresponds to a network link between interfaces of the plurality of interfaces;
setting a direction property for each of a plurality of edges of the graph based on the direction of isolation information;
excluding edges from the graph that have a direction property set;
running a breadth first search (BFS) of the graph to identify isolated sections of the graph; and for each isolated section of the graph, including each node of the isolated section in an administrative domain specific to the isolated section.

13. The system of claim 8, wherein generating, based on the network data, the observation point mapping information comprises:
for each administrative domain of the plurality of administrative domains:
for each workload within the administrative domain, creating an entry in the observation point mapping information that maps the administrative domain to each observation point that captures flow records of the workload.

14. The system of claim 8, wherein the method further comprises:
using the source workload and the destination workload to perform at least one of the following operations:
segregate the flow record with respect to a plurality of flow records; or
de-duplicate the flow record with respect to the plurality of flow records.

15. A non-transitory computer-readable medium comprising instructions to be executed in a computer system, wherein the instructions when executed in the computer system perform a method for identifying workloads in a networking environment based on a flow record from an observation point, the method comprising:
receiving network data from one or more endpoints in the networking environment, wherein the network data comprises topology data and routing data;
determining, based on the network data, a plurality of administrative domains within the networking environment, wherein each of the plurality of administrative domains comprises a distinct section of the networking environment within which every Internet Protocol (IP) address is unique;
generating, based on the network data, observation point mapping information that maps each observation point within the networking environment to one of the plurality of administrative domains;
generating, based on the network data, a plurality of lookup tables, wherein each of the plurality of lookup tables is associated with one of the plurality of administrative domains, and wherein each of the plurality of lookup tables maps IP addresses to administrative domains;
generating, based on the network data, a workload identification table that maps combinations of IP addresses and administrative domains to workloads, wherein each observation point within the networking environment comprises an endpoint capable of observing a flow record;
receiving the flow record from the observation point, wherein the observation point comprises an endpoint at which the flow record was observed, and wherein the flow record comprises a source IP address, a destination IP address, and an observation point; and
identifying a source workload and a destination workload of the flow record using the observation point mapping information, a lookup table of the plurality of lookup tables, and the workload identification table by:
using the observation point mapping information to determine an administrative domain that is mapped to the observation point;
selecting, using the administrative domain, the lookup table of the plurality of lookup tables, wherein the lookup table is associated with the administrative domain;
using the lookup table to determine a source administrative domain that is mapped to the source IP address and a destination administrative domain that is mapped to the destination IP address;
using the workload identification table to identify a source workload that is mapped to a combination of the source IP address and the source administrative domain; and
using the workload identification table to identify a destination workload that is mapped to a combination of the destination IP address and the destination administrative domain.

16. The non-transitory computer-readable medium of claim 15, wherein the flow record comprises a tuple including the source IP address, the destination IP address, a source port, a destination port, and a protocol, and wherein the method further comprises:
generating a second tuple comprising the source IP address, the destination IP address, the source port, the destination port, the protocol, the source administrative domain, and the destination administrative domain.

17. The non-transitory computer-readable medium of claim 15, wherein determining, based on the network data, the plurality of administrative domains within the networking environment comprises:
using the network data to divide the networking environment into the plurality of administrative domains such that at least one of the following is achieved:
each given virtual network interface controller (VNIC) within the networking environment is included within an administrative domain that is specific to the given VNIC;
all interfaces of a given layer 3 (L3) subnet within the networking environment are included within an administrative domain specific to the given L3 subnet; or
all subnets within a given virtual private cloud (VPC) within the networking environment are included within an administrative domain specific to the given VPC.

18. The non-transitory computer-readable medium of claim 15, wherein the network data further comprises network address translation (NAT) rules, and wherein determining, based on the network data, the plurality of administrative domains within the networking environment comprises:
using the NAT rules to determine direction of isolation information for a plurality of interfaces within the networking environment; and
determining administrative domain boundaries based on the direction of isolation information.

19. The non-transitory computer-readable medium of claim 18, wherein determining the administrative domain boundaries based on the direction of isolation information comprises:
using the network data to model a topology of the network as a graph such that each node of the graph corresponds to an interface of the plurality of interfaces and each edge of the graph corresponds to a network link between interfaces of the plurality of interfaces;
setting a direction property for each of a plurality of edges of the graph based on the direction of isolation information;

excluding edges from the graph that have a direction property set;

running a breadth first search (BFS) of the graph to identify isolated sections of the graph; and for each isolated section of the graph, including each node of the isolated section in an administrative domain specific to the isolated section.

20. The non-transitory computer-readable medium of claim 15, wherein generating, based on the network data, the observation point mapping information comprises:

for each administrative domain of the plurality of administrative domains:

for each workload within the administrative domain, creating an entry in the observation point mapping information that maps the administrative domain to each observation point that captures flow records of the workload.

21. The non-transitory computer-readable medium of claim 15, wherein the method further comprises:

using the source workload and the destination workload to perform at least one of the following operations:

segregate the flow record with respect to a plurality of flow records; or de-duplicate the flow record with respect to the plurality of flow records.

* * * * *